United States Patent
Hoefling et al.

[11] Patent Number: 6,129,442
[45] Date of Patent: Oct. 10, 2000

[54] LIGHTING DEVICE FOR SYSTEMS USED FOR CONVEYING PEOPLE

[75] Inventors: Peter Hoefling, Dortmund; Eckhard Knoop, Bochum; Klaus Schoeneweiss, Hattingen, all of Germany

[73] Assignee: O&K Rolltreppen GmbH & Co. KG, Hattingen, Germany

[21] Appl. No.: 09/051,850

[22] PCT Filed: Oct. 18, 1996

[86] PCT No.: PCT/EP96/04527

§ 371 Date: Aug. 3, 1998

§ 102(e) Date: Aug. 3, 1998

[87] PCT Pub. No.: WO97/15520

PCT Pub. Date: May 1, 1997

[30] Foreign Application Priority Data

Oct. 23, 1995 [DE] Germany ............... 195 39 307
Dec. 15, 1995 [DE] Germany ............... 195 46 937

[51] Int. Cl.[7] ............... F21S 8/10; F21V 8/00
[52] U.S. Cl. ............... 362/146; 362/511; 362/576
[58] Field of Search ............... 362/145, 146, 362/559, 560, 576, 583, 293, 551, 478, 459, 511; 198/335, 337; 104/25

[56] References Cited

U.S. PATENT DOCUMENTS

| | | | |
|---|---|---|---|
| 2,479,500 | 8/1949 | Longberg | 362/146 |
| 4,733,332 | 3/1988 | Yamashita et al. | 362/146 |
| 4,800,474 | 1/1989 | Bornhorst | 362/293 |
| 4,896,759 | 1/1990 | Badstuebner et al. | 198/335 |
| 5,040,659 | 8/1991 | Saito et al. | 198/335 |
| 5,067,062 | 11/1991 | Rulke | 362/146 |
| 5,339,228 | 8/1994 | Baethge et al. | 362/146 |
| 5,613,758 | 3/1997 | Kamschal et al. | 362/146 |

FOREIGN PATENT DOCUMENTS

| | | |
|---|---|---|
| 0676362 | 10/1995 | European Pat. Off. |
| 3528177 | 2/1987 | Germany |
| 3804732 | 8/1989 | Germany |
| 3843090 | 9/1989 | Germany |
| 4209505 | 7/1993 | Germany |

*Primary Examiner*—Alan Cariaso
*Attorney, Agent, or Firm*—Venable; Robert Kinberg; Catherine M. Voorhees

[57] ABSTRACT

A lighting device for passenger conveyors, such as escalators and travelators, is provided particularly in the region of the handrail and/or skirting of the passenger conveyor, and includes at least one light-guide oriented in the conveying direction of the passenger conveyor, substantially continuously, having lateral light emission and which in the region of at least one of its ends can receive the bundled light beam of a light source. The light-source runs along the length of the conveyor and its end faces a projector whereby light generated by an electric lamp of the projector is passed through a light concentrator to bundle the light into a concentrated beam. The bundled light beam is projected onto the end of the light-guide thereby lighting one of the handrail and the step track, respectively, along the transport direction of the passenger conveyor.

24 Claims, 5 Drawing Sheets

LIGHTING DEVICE FOR SYSTEMS USED FOR CONVEYING PEOPLE

BACKGROUND OF THE INVENTION

The invention relates to a lighting device for passenger conveyors such as escalators and travelators.

From DE-A 38 43 090 a moving staircase or moving pavement comprising at least one balustrade and a lighting device extending at least in part along the balustrade as well as a supporting device for a handrail running on the balustrade is known. The supporting device consists of at least one translucent profile, more particularly of a plastics material, comprising a cavity for accommodating the lighting device. The supporting device includes a conduit for wiring or the like located concealed in the region of the moving staircase or pavement comprising the lighting device. The lighting device extends in the form of a plurality of fluorescent tubes between the upper and lower head of the balustrade. The drawback is this arrangement is that due to the use of conventional fluorescent tubes as the lighting device, the power supply automatically needs to be safeguarded in addition to the flourescent tube. Electricity in the region of passenger conveyors is always a potential hazard, especially as regards vandalism or the like. Further, having fluorescent tubes as the lighting device is a disadvantage since these can easily become defective due to wear and tear or damage due to the cover receiving impact, necessitating a not inconsiderable time to replace such defective components.

To obviate this problem DE-C 42 09 505 proposes an escalator having a transparent balustrade, a flexible handrail guided by the top edge of the balustrade and a lighting device arranged in a cavity underneath the handrail. This lighting device is formed of fibre light-guides consisting of a material that guides beams of light entering the light-guide at at least one location substantially parallel to the handrail. The light emission surface area is formed by the surface area of the light-guide facing downwards with the cross-section of the light-guide being configured rectangular and tapered over the length of the light-guide and the cross-sectional surface area of the cavity remaining in each case being filled out with a counterlayer. Although light can be introduced into the cross-section of the light-guide already via an active light source and is emitted oriented, the drawback in this arrangement is due to the fact that the fibres need to be oriented as well as due to the taperered contour of the light guide a not inconsiderable expense to the fabrication of the light-guide. Thus, these light-guide are considerably more expensive. In addition to this, due to the selected cross-sectional shape, the profile accommodating the light-guide is also complicated unduly.

EP-A 676 362 discloses a lighting device incorporating light-guides for moving staircases or pavements in which light is guided from at least one central light source to lighting points of the moving staircase or pavement by light-guides extending at least in part along the balustrade. The lighting points are passive light sources. Each light source includes a mounting device, a light-guide receptacle and preferably integrated optics, distributed over the system spatially discrete and connected via separate discrete light-guides configured as a glass fibre to the light-guide connection of a central active light source with a lighting fixture in a housing. Even though, lighting of the step or pallet track can be achieved by incorporating a plurality of so-called spots as passive light sources in the skirting, undue expense is involved since a separate optical fibre cable needs to be put down to each spot and likewise a plurality of ports needs to be incorporated in the skirting to receive the spots which also require securing there.

SUMMARY OF THE INVENTION

The object of the subject matter of the invention is to sophisticate a lighting device of the aforementioned kind so that with little expense in fabrication and assembly a light-guide installation is provided which may also be retrofitted, if. As a result of the lighting device of the invention lighting in various areas of the escalator or travelator can be achieved.

This object is achieved by a lighting device for passenger conveyors, such as escalators and travelators where the lighting device is provided preferably in the region of the handrail and/or skirting of the passenger conveyor and comprises at least one light-guide provided at least in the fitted condition continuous substantially in the conveying direction of the passenger conveyor having a lateral light emission capable of receiving the pencil light beam of at least one light source in the region of at least one on its ends.

By making use of a homogenously smooth and flexible light-guide consisting of a translucent material such as for example fibre-glass or plastics material surrounded preferably by a sheath of a translucent material and/or guided in a cavity of a profile consisting likewise of a translucent material, a lighting device which is simple to fabricate is provided. This lighting device of the invention does not require; maintenance necessitating the use of electricity in the conveyance area of the passenger conveyor. Further, the lighting device of the invention does not require a plurality of individual optical fibre cables and is cost-effective in fabrication and installation. Since the light-guide is flexible there is no problem of it being guided from one end of the passenger conveyor through the cavity of the profile. The flexible light-guide substantially fills out the profile, especially when good sliding properties exist between the peripheral surface area of the cavity and the outer circumferential surface area of the light-guide. It is also not necessary that the light-guide be in one piece. When the balustrades are modular in conception the light-guide may be provided, for example, in corresponding modular lengths, the face surface areas of the corresponding pieces being closely juxtaposed following assembly of the individual modules and thus resulting in a continuous light-guide in the fitted condition of the escalator or travelator. The transmission losses are unsubstantial as long as the corresponding face surface areas are closely juxtaposed.

As the active light source a projector consisting of a lamp and lens, for example, may find application. The lens produces, a pencil or bundled beam of the light emitted by the lamp, and this beam is projected against one of the cross-sectional surface areas of the light-guide. Depending on the luminous intensity to be provided in the region of the handrail and/or in the region of skirting of the passenger conveyor one or more projectors may be provided. In a preferred embodiment, one or more projectors are disposed; at protected locations such as e.g. in the service bay of the passenger conveyor. Any number of such projectors may be put to use which then feed light into corresponding portions of light-guides e.g. depending on the length of the passenger conveyor. It is likewise conceivable to feed continuous light signals to some portions of the light-guide(s) and discontinuous, i.e. flashing light signals to other portions.

Since the light-guide emits light over its full circumferential surface area, it is expedient to concentrate the light so that the circumferential portions not needed for light emission are covered by a reflective film. This also enables the power of the projector(s) to be limited.

In addition it is proposed that when the light-guide is returned in the region of the handrail return it is to be guided into the region of the service bay. The light-guide is darkened in the region of the handrail return to prevent emission of stray light in this area, i.e. it is guided, more particularly, in a hose.

To achieve a variety of colored effects at least one colored disk caused to rotate circumferentially, more particularly, by a motor drive may be provided in the region between the lamp and the lens.

Furthermore, it is proposed to provide the profiles accommodating the light-guide with longitudinal grooves so that the cavity region in the balustrade and/or skirting is concealed from view generally this highlighting appearance feature simultaneously give the impression of having increased the surface area of the profile(s).

The profile(s) may be provided to accommodate, on the one hand, the handrail in the corresponding balustrade portion and, on the other, the lighting of the step track directly in the skirting area, it then being connected, more particularly releasably, to the components of the skirting.

It is furthermore of advantage that this type of lighting device is suitable practically with no problem, as a lighting system which replaces conventional passenger conveyor lighting systems. This replacement lighting system merely requires the conventional fluorescent tubes and their wiring to be removed and then simply a support of any simple kind is provided to mount the light-guide which is independent of any electric powering so that the light-guide is provided instead of the fluorescent tubes.

The subject matter of the invention has a very versatile range of application. In addition to lighting the balustrade as well as the step or pallet track the light-guide(s) may also light other areas of the passenger conveyor such as e.g. boarding and alighting areas or in the balustrade heads to produce lighting effects of a highly different kind in these areas. It is likewise conceivable to provide lighting of the peripheral areas of the passenger conveyors such as e.g. the skirting area outside of the step track.

BRIEF DESCRIPTION OF THE DRAWINGS

The subject matter of the invention will now be described on the basis of basic arrangements as shown in the drawing in which.

DETAILED DESCRIPTION OF THE INVENTION

Figure 1:
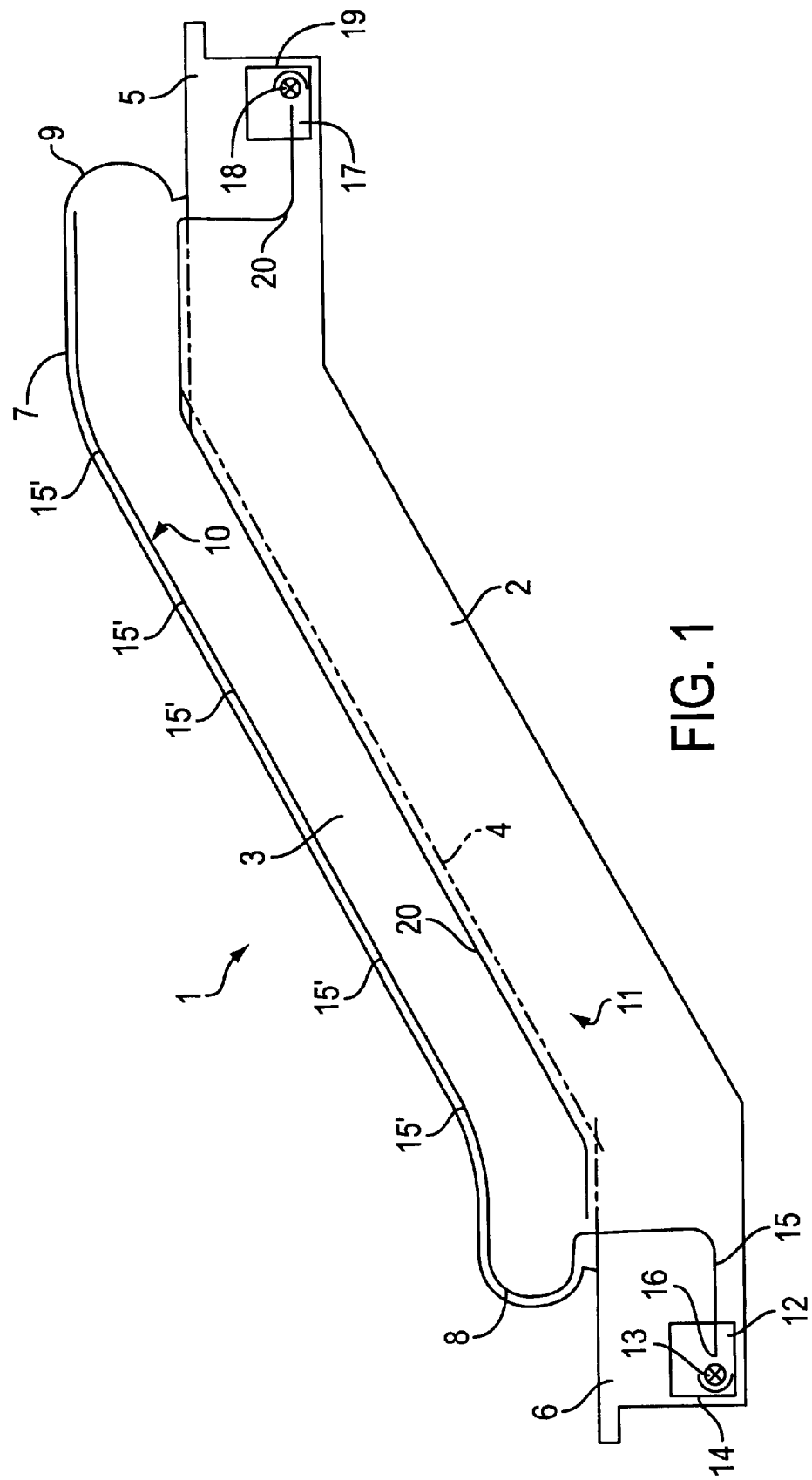
FIG. 1 illustrates a basic arrangement of an escalator indicating the lighting in both the balustrade and step track area.

Referring now to FIG. 1 there is illustrated a basic arrangement of an escalator 1, the salient components of which are as follows:

a frame 2, a balustrade 3, a step track 4 (indicated by a dashed line), an upper and lower service bay 5, 6 accommodating drive components and the like (not shown) provided in the frame, and a handrail 7 running along the top of the balustrade 3 and returnable in the region of the balustrade heads 8, 9. For lighting the balustrade 3, as well as the step track 4, two separate lighting devices 10, 11 are provided in this example. However, as will be detailed later, other variants are also conceivable to be adapted to the particular circumstances in each case. The lighting device 10 contains a projector 12 comprising an active light source in the form of a lamp 13 and a mirror 14 as the light concentrator. The light-guide 15 consisting of fibre-glass material finds application into which the pencil or bundled beam of light provided by the lamp 13 is fed at the end 16 facing the lamp 13. The light-guide 15 has a prescribed thickness (e.g. 20 mm diameter) and is guided from the service bay 6 in protected form into the region of the balustrade head 8. Since the light-guide 15 features lateral light emission (i.e. light is emitted over its total circumferential surface area) it should be guided in a darkened form, e.g. within a hose (not shown) in areas of the passenger conveyor not necessarily requiring lighting or where stray light could possibly prove a nuisance to passengers of the conveyor. One of these areas could be e.g., the handrail return at the balustrade head 8. The reference numeral 15 identifies partial lengths of the light-guide 15 which may be needed but which are not mandatory in application.

The lighting device 11 is similar in structure to lighting device 10. It too, includes a projector 17 together with the lamp 18 and light concentrator 19. Light from this active light source 15 is fed into a further light-guide 20 which in this example consists of a continuous rod. But of course, here too, partial lengths may be used depending on the particular application. This light-guide 20 serves to illuminate the step track 4. Defining the projector capacity depends on the desired degree of brightness and on the length of the passenger conveyor which especially in the case of travelators may be many times the length of an escalator.

Figure 2:
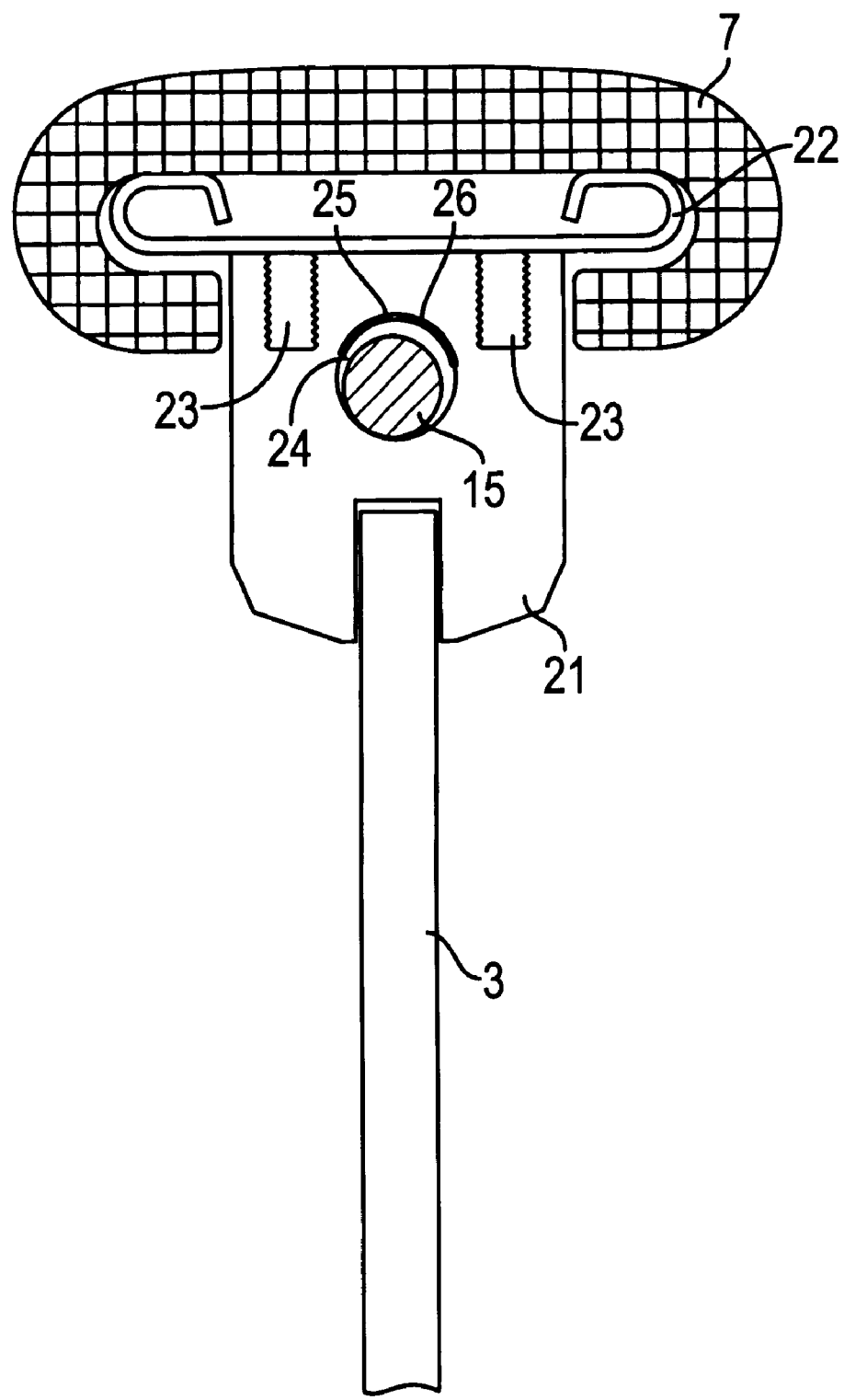
FIG. 2 is a cross-section through the handrail guide of the passenger conveyor as shown in FIG. 1.

Referring now to FIG. 2 there is illustrated a cross-section through the hand rail of escalator 1 as shown in FIG. 1. Evident is the balustrade 3 consisting more particularly of glass, a profile 21 mounted thereon, preferably consisting of a translucent material such as acryl or the like, a handrail guide element 22 mounted on the profile 21 as well as the handrail 7 itself. The handrail guide element 22 is releasably secured to the profile 21, for example in this case by screws 23 (schematically shown). The profile 21 comprises furthermore a cavity 24 extending longitudinally, serving to accommodate the light-guide 15 (again schematically shown). Since the light-guide emits light laterally over its full circumferential surface area homogenously, but which is not always desirable a reflecting film 26 may be provided in the upper region 25 of the cavity 24, supposing a concentrated emission of light is desired exclusively downwards. In this example the profile 21 is mounted centrally on the balustrade 3 and connected thereto preferably by bonding. Other configurations, more particularly asymmetrical arrangements, are likewise conceivable depending on the desired type of passenger conveyor involved. It is furthermore conceivable that—when film application is not necessary—the light-guide 15 fills out the cavity 24 more or less completely. Not shown also is how the light is fed into the cross-section of the light-guide 15. In this case the projector 12, 17 consisting of at least one lamp 13,18 as well as at least one light concentrator 14, 19 as shown in FIG. 1 is put to use, preferably positioned in the service bay 5, 6 of the passenger conveyor 1.

Figure 3:
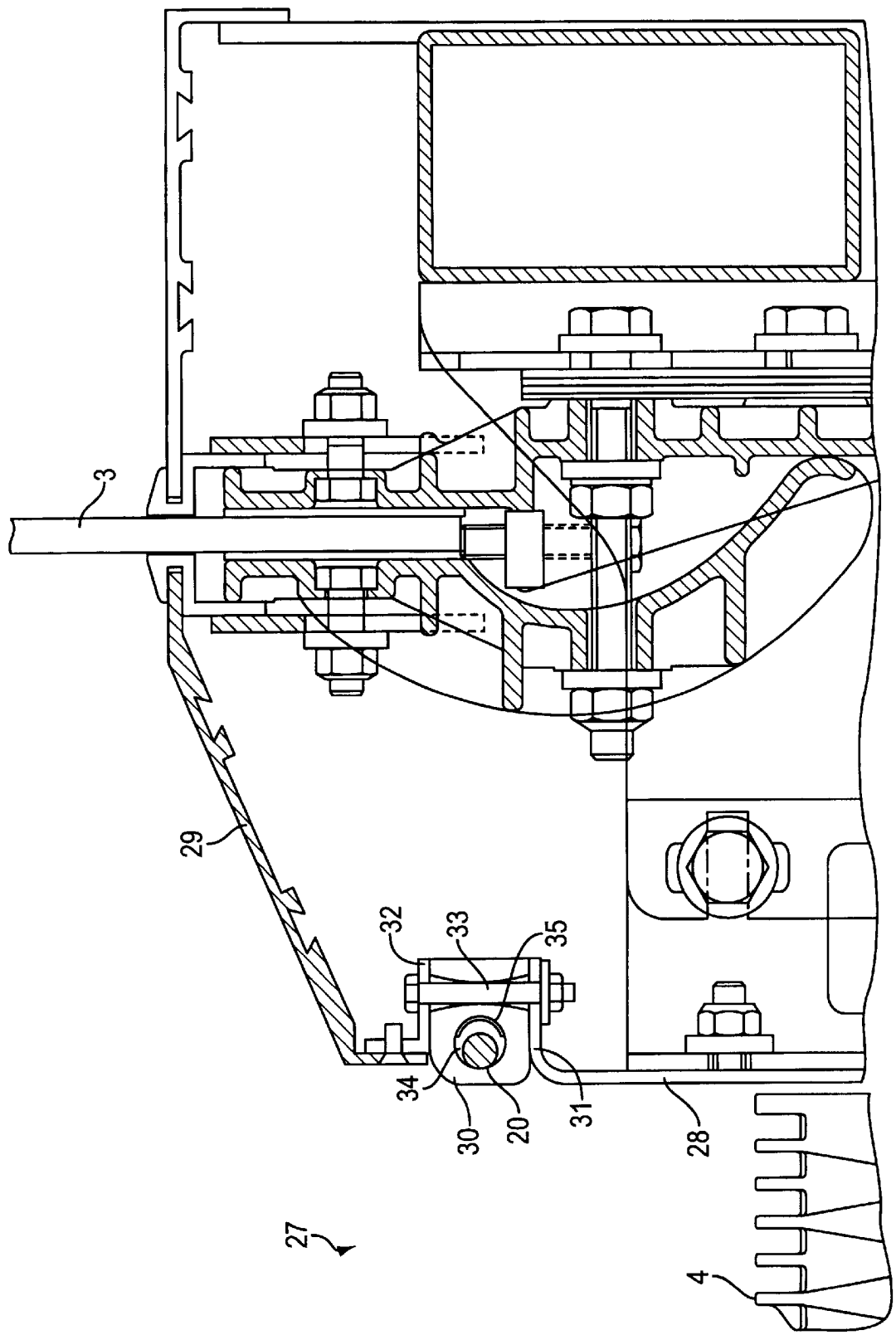
FIG. 3 is an illustration of the skirting area of the passenger conveyor as shown in FIG. 1.

Referring now to FIG. 3 there is illustrated the skirting area 27 of the escalator 1 as shown in FIG. 1 illustrating the step track 4, the skirting 28 as well as the guard 29 extending between the skirting 28 and the balustrade 3. Here too, a translucent profile 30 e.g. of acryl is provided arranged in the region of the skirting 28. The skirting 28 is swept down, the profile 30 being mounted on the downswept portion 31. The profile 30 is fixed in the region of the skirting 28 by further components 32, 33. Provided in the profile 30 is a continuous cavity 34 serving to accommodate the light-guide 20 (likewise schematically shown). Here too, a reflecting component 35 may be provided in the region of the cavity 34 should pencil or bundled beaming of the emitted light exclusively in the direction of the step track 4 be desired.

Referring now to FIGS. 4 to 7, there are illustrated various ways and means of feeding the active light into the light-guide. In all of these Figs., projectors 36 are evident containing lamps 37 as the active light sources as well as light concentrators 38 for pencilling the light into a concentrated beam.

Figure 4:
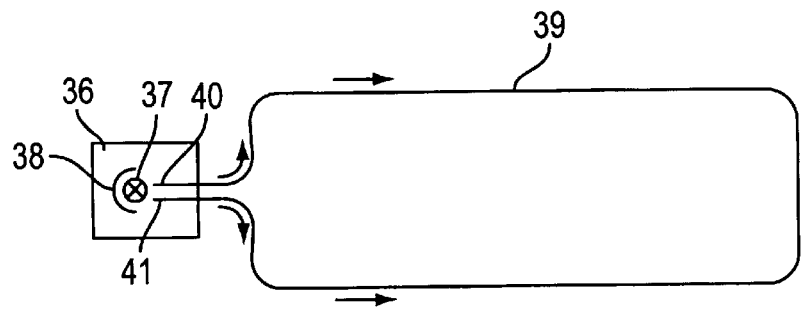
FIGS. 4 to 7 illustrate various means of feeding light into light-guides for passenger conveyors.

In FIG. 4 the lamp 27 features a relatively high wattage so that it is able to feed light into a closed light-guide circuit 39, i.e. such that light is fed homogenously into both ends 40, 41 which then propagates in the direction of the arrow. Thus, by means of but a single projector 36 both the region of the balustrade and the region of the step or pallet track can be illuminated to the same degree.

Figure 5:
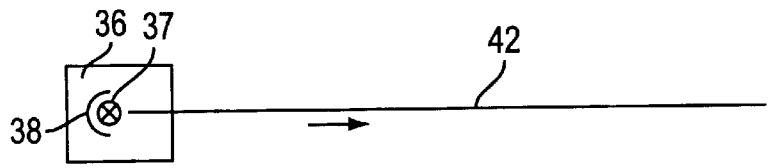

FIG. 5 shows a single projector 36 for feeding light into a single light-guide 42, for example for illuminating the balustrade, the step or pallet track or, however, also the boarding or alighting areas of the passenger conveyor. In the latter case flashing light could be fed into the light-guide 42 to enhance safety.

Figure 6:
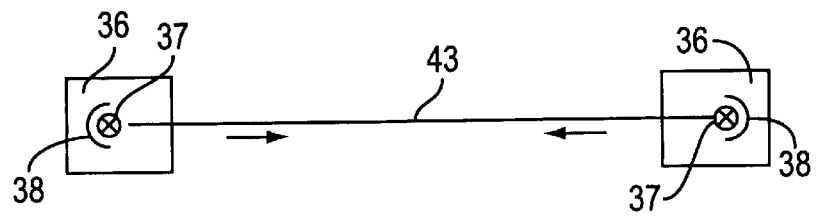

In FIG. 6 only one light-guide 43 is likewise provided into which light is fed at both ends by means of the projector 38, a variant of this kind finding application e.g. in the case of of extra-long travelators.

Figure 7:
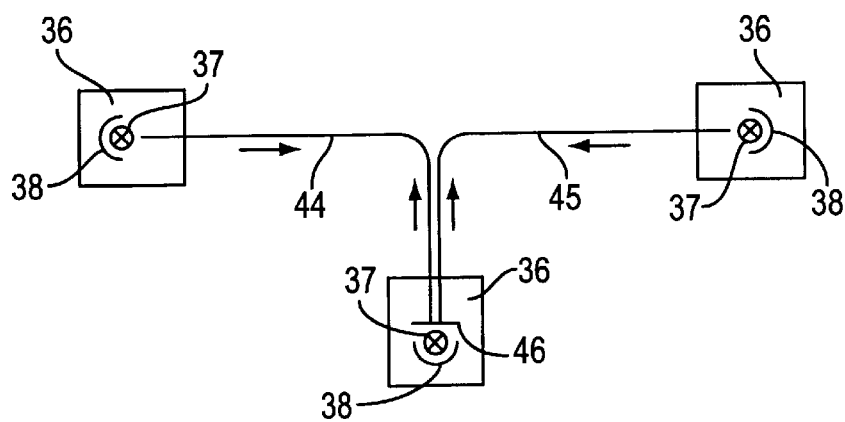

Referring now to FIG. 7 there is illustrated a further alternative, configured in such a way that three projectors 36 feed light to differing locations of partial sections 44, 45. This variant may also be put to use in the case of extra-long passenger conveyors, it being likewise possible to feed flashing light to preferred partial sections, e.g. for warning purposes in each partial section 44 and/or 45. There is furthermore the possibility, for instance in the region of one of the projectors 36, to provide a rotatively driven disk 46 producing visual effects, by means of which e.g. alternating colors may be produced.

It will be appreciated that the examples as cited above can be combined as desired depending on the application in question and thus are not to be interpreted as limiting the possibilities as regards further different kinds of feeding light into the corresponding light-guide.

Figure 8:
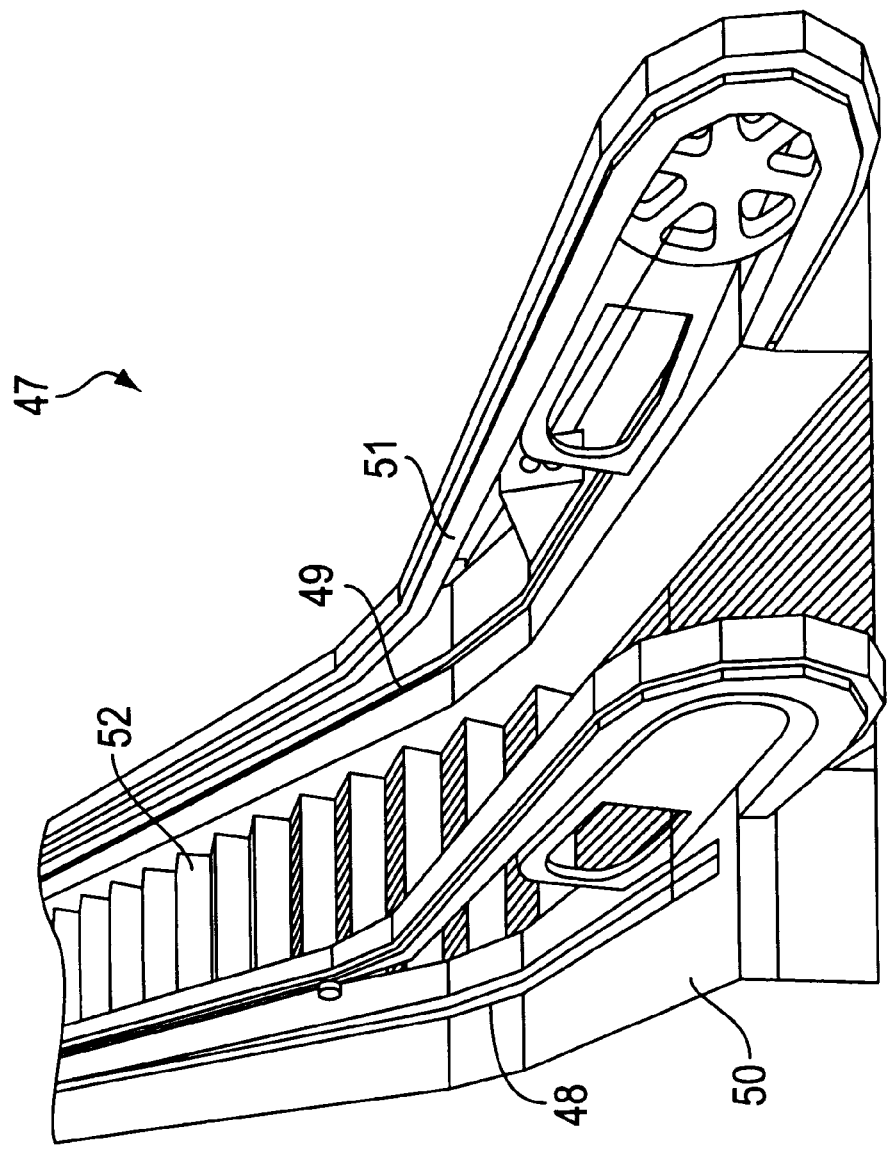
FIG. 8 illustrates an alternative arrangement of the lighting device on an escalator.

Referring now to FIG. 8 there is illustrated yet a further alternative of arranging the lighting device in accordance with the invention in the region of an escalator 47. The continuous light-guides 48, 49 in this example are provided in the skirting area 50, 51, i.e. outside of the step track 52 as a result of which a substantially upwards oriented light emission and the various effects of the kind as already described can be achieved. Feeding the light into the light-guides 48, 49 may be done analogously to the example embodiments as described above. For accommodating the light-guide 48, 49 again a profile can be likewise put to use analogously to the situations as shown in FIGS. 2 and 3.

What is claimed is:

1. A lighting device for people carrier systems including escalators and moving pavements having a handrail, a balustrade skirting, a balustrade cooperating with the balustrade skirting at its bottom end and a handrail supported at its upper end, and a step track adjacent to the balustrade skirting, said lighting device comprising:

a light-guide which runs essentially in a transport direction of a people carrier system of a length and is continuous, at least in an installed state, along the length of the people carrier system, said light-guide having a first end and a lateral light emission; and at least one light source constructed as a projector and including an electric lamp and a light concentrator whereby said light-guide is provided in one of an area of the handrail and a region of said balustrade skirting and its first end faces said projector, and whereby light generated by said electric lamp is passed through said light concentrator to bundle the light into a concentrated beam and said bundled light beam is projected onto said first end of said light-guide thereby lighting one of the handrail and the step track, respectively, along the transport direction.

2. The light device as set forth in claim 1, wherein said light-guide is made of a homogeneously translucent material over part or all of its length.

3. The lighting device as set forth in claim 1, wherein said light-guide is made of a flexible glass fibre or plastic material having a smooth outer peripheral surface.

4. The lighting device as set forth in claim 1, wherein said light-guide is guided at least in part within a sheath made of a translucent material.

5. The lighting device as set forth in claim 4, wherein said light-guide is guided in a cavity of a profile section made of a translucent material.

6. The lighting device as set forth in claim 5, wherein said light-guide fills out substantially the cross-section of said cavity.

7. The lighting device as set forth in claim 1, wherein said light-guide has an essentially rounded cross-section.

8. The lighting device as set forth in claim 5, wherein said profile section is made of plastic.

9. The lighting device as set forth in claim 8, wherein said plastic is acrylic.

10. The lighting device as set forth in claim 1, further comprising a first profile section for accommodating said handrail, said first profile section being connected at one end to said balustrade and at the other end to a handrail guide element.

11. The lighting device as set forth in claim 1, further comprising a second profile section in the region of a recess in said balustrade skirting, said second profile section being releasably connected to said skirting.

12. The lighting device as set forth in claim 1, wherein said light-guide is guided underneath said handrail in the region of at least one of the handrail returns.

13. The lighting device as set forth in claim 1, wherein said light-guide is disposed in a darkened state in the region of said handrail return.

14. The lighting device as set forth in claim 13, wherein said light-guide is disposed within an element made of a non-translucent material disposed in the region of said handrail return.

15. The lighting device as set forth in claim 5, wherein at least one of said cavity and said light-guide is at least one of provided with a reflecting component for concentrating the light emerging laterally from said light-guide over its peripheral surface area in a region of the peripheral surface area not required for illumination.

16. The lighting device as set forth in claim 1, wherein said projector is arranged a service bay of said people carrier system.

17. The lighting device as set forth in claim 1, wherein at least one projector is provided on each side of said people carrier system.

18. The lighting device as set forth in claim 17, wherein one of said projectors is provided for one light-guide in the region of said handrail and one further projector is provided for a light-guide in the region of said skirting.

19. The lighting device as set forth in claim 18, wherein one of said two projectors is provided to feed a continuous light signal and said other projector is provided to feed a discontinuous light signal.

20. The lighting device as set forth in claim 1, further comprising a plurality of projectors arranged in protected areas of said people carrier system for feeding differing light signals into corresponding ends of said light-guide.

21. The lighting device as set forth in claim 1, further comprising elements that produce optical effects, said elements being disposed between said lamp and said light concentrator.

22. The lighting device as set forth in claim 21, wherein said elements are disk-shaped and rotatable.

23. The lighting device as set forth in claim 1, wherein said light-guide is provided in the skirting area of said people carrier system outside of said step track.

24. The lighting device as set forth in claim 23, wherein said light-guide is provided in said skirting area and has essentially upwardly directed light emission.

* * * * *